United States Patent [19]

Spitz et al.

[11] Patent Number: 4,972,275
[45] Date of Patent: Nov. 20, 1990

[54] WIDEBAND RADIO-FREQUENCY BROADCAST RECORDER AND RADIO TESTING SYSTEM

[75] Inventors: Raymond C. Spitz, Plymouth; Shinji Kakuyama, Bloomfield Hills, both of Mich.

[73] Assignee: Ford Motor Company, Dearborn, Mich.

[21] Appl. No.: 313,935

[22] Filed: Feb. 22, 1989

[51] Int. Cl.⁵ .................. H04N 5/782; G11B 5/008
[52] U.S. Cl. .......................... 360/55; 369/6; 369/7; 358/335; 455/226
[58] Field of Search ............ 358/320, 330, 10, 23, 358/38, 47, 455, 335; 360/8, 9.1, 65, 66, 55; 369/6, 7, 8; 455/226; 343/711, 712, 713, 714, 715, 718, 751, 756

[56] References Cited

U.S. PATENT DOCUMENTS

| | | |
|---|---|---|
| 2,697,746 | 12/1951 | Kennedy .............................. 358/181 |
| 3,164,685 | 1/1965 | Banning, Jr. et al. .................. 369/7 |
| 3,270,131 | 8/1966 | Dinten .................................. 358/185 |
| 4,038,692 | 7/1977 | Ueda et al. ............................ 360/66 |
| 4,263,624 | 4/1981 | Gundry ................................. 360/66 |
| 4,344,094 | 8/1982 | Ohtake et al. ......................... 360/66 |
| 4,850,037 | 7/1989 | Bochmann .......................... 343/712 |

Primary Examiner—Robert L. Richardson
Attorney, Agent, or Firm—Mark Mollon; Paul K. Godwin

[57] ABSTRACT

A tape recording apparatus in the form of a modified VCR is employed to record broadcast signals received by an antenna while moving through a radio-broadcast reception area. The recorded signals are maintained in an undetected, modulated-carrier form so that played-back signals from the VCR can be coupled to a radio receiver in a fixed location for testing under mobile conditions. A commercially available VCR is modified to avoid modulating FM signals by frequency a second time.

14 Claims, 4 Drawing Sheets

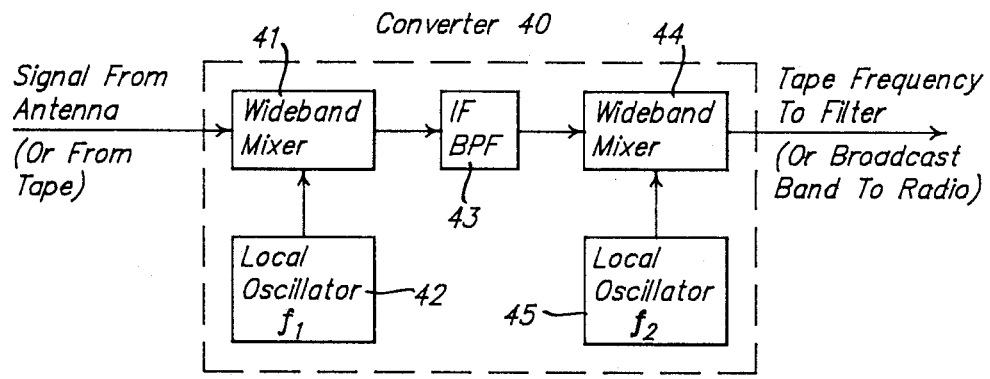
FIG. 4.
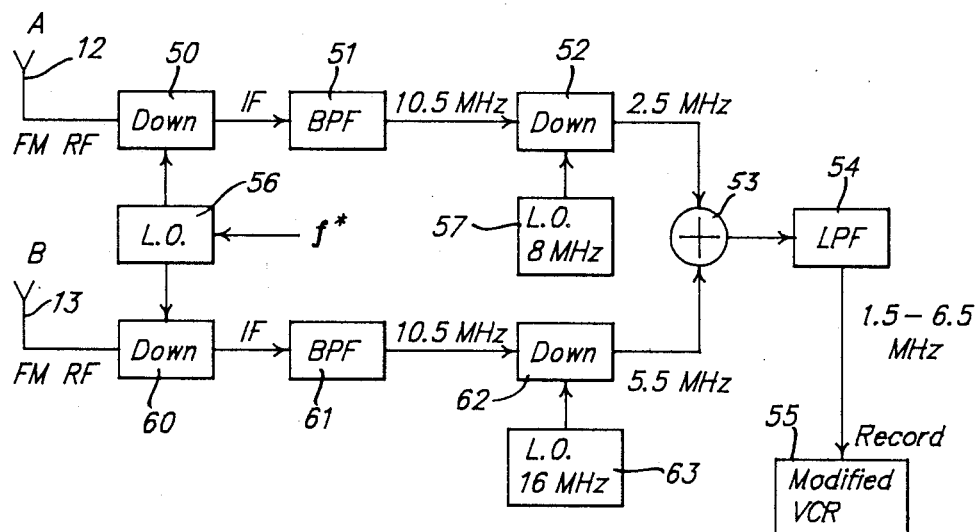
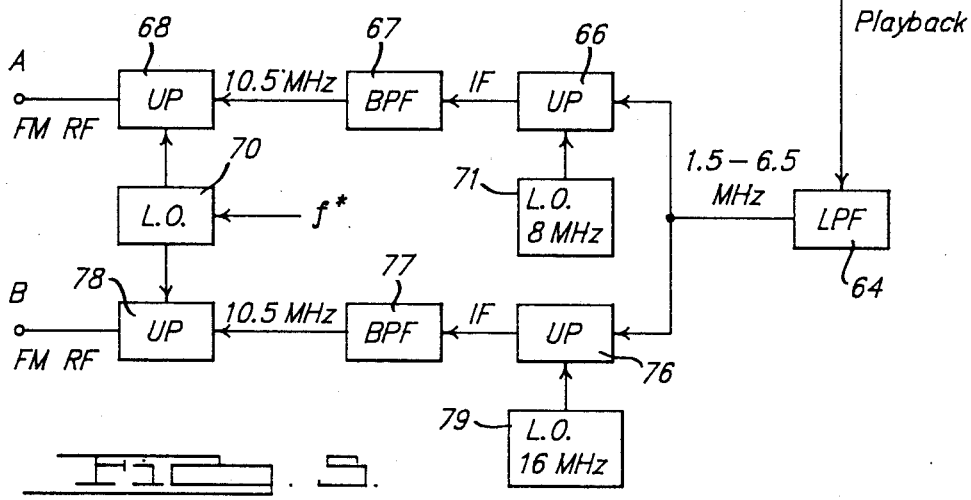
FIG. 5.

WIDEBAND RADIO-FREQUENCY BROADCAST RECORDER AND RADIO TESTING SYSTEM

Background of the Invention

The present invention relates, in general, to a method of providing test signals in a fixed location corresponding to radio-frequency broadcast signals received by a moving receiver and, more specifically, to a tape recorder for storing modulated radio frequency signals received from a plurality of antennas on a moving vehicle.

In developing a product, proper engineering design requires that testing and verification be done in the actual environment for which the product is intended to be used. In the case of automobile radio receivers, this means expensive, inconvenient, and time-consuming road tests. Furthermore, the kinds of testing that can be done in a mobile vehicle are limited. It would be advantageous to simulate road conditions in a fixed location where radio performance can be better analyzed.

Road testing is particularly critical with diversity reception systems which employ a plurality of spaced apart antennas. Spaced receiving antennas receive signals that have traveled over different transmission paths from a transmitting tower. The antenna separation in a diversity reception system is such that each received signal is subject to different propagation conditions, including undesirable conditions which may cause fading or interference from reflections. Therefore, the various signals received from the antennas exhibit different received signal strengths. A diversity radio receiver selects the highest quality received signal, or combination of signals, for detection of the audio content that is then amplified and output to a speaker. Since transmission paths change continually in a moving vehicle, mobile testing is unavoidable in designing diversity systems.

U.S. Pat. No. 4,713,801 shows an automotive tape recorder for recording a radio broadcast after detection in a radio tuner. Thus, the recorded information is of the audio output and not the input antenna signals that were received by the radio tuner and processed to obtain the audio output. Therefore, this recorder would be adaptable only for testing of an actual radio tuner output after detection of audio content.

Video recorders have been used in conjunction with radar receivers to record radar signals, as shown in Miller, U.S. Pat. No. 4,047,170 and Schwab et al, U.S. Pat. No. 4,287,533. In each patent, radar information is formatted for recording with commercial video tape recorders. The information can then be played back in order to reproduce the radar system output. However, a working radar system is needed in order to either record or play back radar information. Therefore, these systems are not useful for testing of either mobile or fixed systems.

SUMMARY OF THE INVENTION

Accordingly, it is a principal object of the present invention to provide method and apparatus for efficiently analyzing automotive radio performance.

It is a further object of the invention to record radio-frequency broadcast signals from at least one moving antenna in order to provide test signals in a fixed location to aid in the development of automotive radios and radio circuits.

It is another object of the invention to modify a commercially available video cassette recorder in order to record undetected broadcast signals from an antenna.

It is still another object to record and playback a plurality of signals having the same frequency with a single recording media.

These and other objects are achieved in a method of providing test signals in a fixed location that replicates radio-frequency broadcast signals received by a moving receiver. The method comprises the steps of: moving a vehicle through an area receiving actual broadcast signals; coupling RF broadcast signals from an antenna mounted on the vehicle to a recording device; recording the broadcast signals on a recording media; transporting the recording media to the fixed location; and playing back the recorded broadcast signals as the RF input to a radio under test. Preferably, the broadcast signals may be derived from a plurality of antennas on the vehicle, and the signals from each antenna may be distinctly recorded by the recording device.

Another aspect of the invention is an apparatus for recording and reproducing undetected (i.e., modulated carrier) radio-frequency broadcast signals in a broadcast band. The apparatus comprises input means adapted to be coupled to an antenna for receiving broadcast signals in a first range of radio frequencies in the broadcast band. First frequency conversion means is coupled to the input means for mixing the broadcast signals with the first oscillating signal to generate frequency-shifted signals in a second range of frequencies coinciding with a recording frequency band of a recording means. The recording means is coupled to the first frequency conversion means for recording the frequency-shifted signals when in a record mode. A recording means is also used for reproducing the frequency-shifted signals when in a playback mode. Second frequency conversion means is coupled to the recording means for mixing reproduced frequency-shifted signals with a second oscillating signal to replicate the original broadcast signals in the broadcast band received at the antenna.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 4 is a block diagram showing a frequency converter as would be used in FIGS. 2 or 3 in greater detail.

FIG. 6(a)–(k) is a diagram showing the frequency shifting of signals in the circuit of FIG. 5.

DETAILED DESCRIPTION OF THE PREFERRED EMBODIMENT

Figure 1:
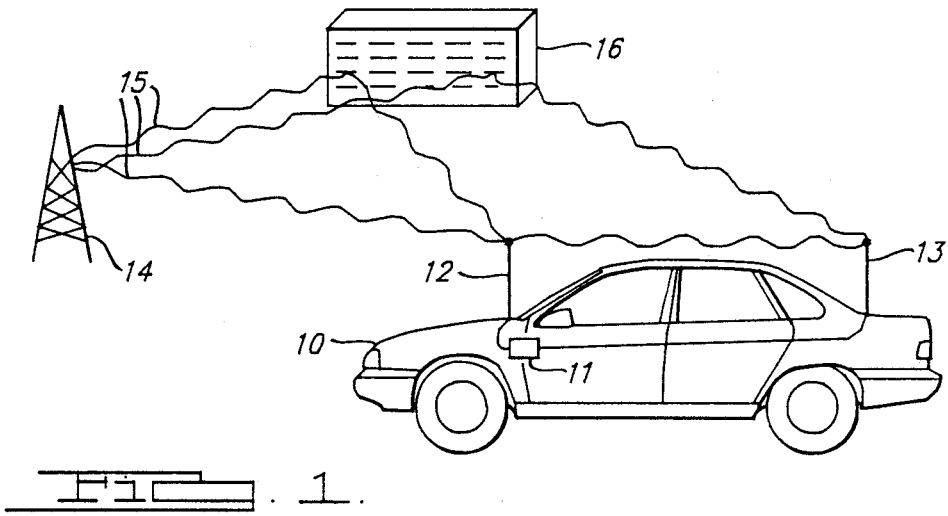
FIG. 1 is a block diagram showing basic concepts of a diversity reception system.

Referring to FIG. 1, an automobile 10 is shown including a diversity reception system 11 which includes spaced apart antennas 12 and 13. A radio transmitting tower 14 transmits modulated-carrier radio-frequency (RF) signals 15 through the atmosphere, as shown, to the locations of antennas 12 and 13.

Typically, RF signals 15 arrive at antennas 12 and 13 by line-of-sight transmission and by reflection from obstacles, such as hills and buildings (exemplified in FIG. 1 as a building 16). In AM transmission, reflection from the ionosphere is also important. Due to localized changes in the ionosphere, radio signals received by a single antenna are subject to fading, which is a drift in the level of received RF signal strength. Likewise, constructive and destructive interference due to reflections from obstructions cause variations in received strength of FM signals in moving vehicles. The signals received at antenna 12 and antenna 13 will often times have different signal strengths due to their separation and the fact that the signal paths between RF transmitting tower 14 and each antenna are independently affected by reflection and fading.

Diversity reception system 11 either selects the best signal at any one time for audio processing or produces a combined signal with relative weighting according to the respective signal strengths.

Conventional testing of diversity reception system 11 requires road testing in order to obtain input signals from antennas 12 and 13 which have the characteristics expected during normal operation in a vehicle. Such field testing requires travel to remote locations so that a wide spectrum of conditions can be experienced. However, it may be inconvenient or impossible to conduct simultaneous or repetitive analysis within the confines of the vehicle as the vehicle is moving.

The problems of the prior art testing methods are solved, according to the present invention, by substituting a recording device for diversity reception system 11 of FIG. 1. The antenna signals are coupled to the recording device and are recorded without being detected, although the signals can be frequency shifted in order to conform to the bandwidth of the recording device. The recording media can then be transported to a fixed location for testing radio equipment. The recorded signals are reproduced in a form substantially equal to the broadcast signals in a modulated-carrier form and are coupled to the input of the radio receiver to be tested.

Figure 2:
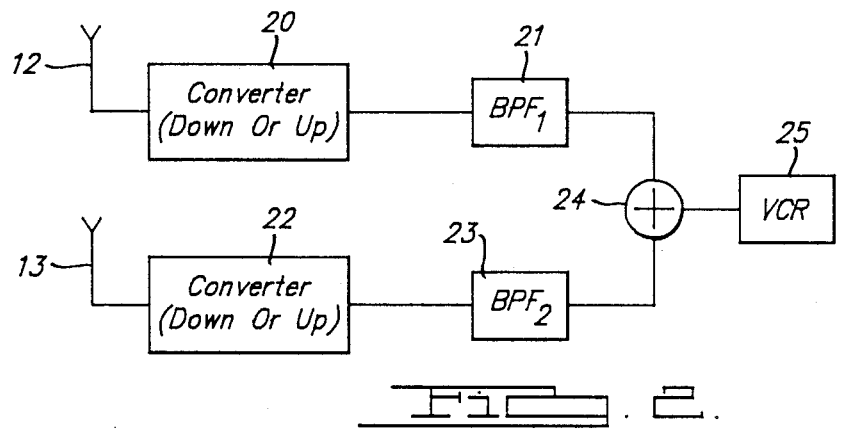
FIG. 2 is a block diagram showing recording circuits according to the present invention.

Referring now to FIG. 2, an apparatus for practicing the present invention is shown wherein signals from diversity antennas 12 and 13 are provided to a video cassette recorder (VCR) 25. VCR 25 has a characteristic frequency range within which signals may be recorded on a magnetic tape contained in a video cassette. For example, the S-VHS type of VCR has a frequency range of from 1.5 megahertz (MHz) to 6.5 MHz. The frequency range of VCR 25 does not match the AM or FM broadcast band of RF signals received by antennas 12 and 13 (AM is broadcast from 535 KHz to 1.605 MHz and FM is broadcast from 88.1 MHz to 107.9 MHz). However, because the diversity signals from antennas 12 and 13 are desired to be recorded separately and distinctly by VCR 25, means are provided between the antennas and the VCR for converting the frequencies of RF signals received by the respective antennas to frequencies that are within separate portions of the frequency range of VCR 25. AM signals must be converted up to the frequency range of VCR 25 while FM signals must be converted down in frequency.

An up or down converter 20 has its input connected to antenna 12 and its output connected to a first bandpass filter 21. A second up or down converter 22 is connected to antenna 13 and to a second bandpass filter 23. A summing amplifier 24 receives the outputs from bandpass filters 21 and 23 and provides a summed output to the recording input of VCR 25. Separate portions of the recording frequency range of VCR 25 are dedicated to recording signals from antenna 12 and antenna 13, respectively. For example, down converter 20 and bandpass filter 21 convert a band of FM frequencies received on antenna 12 to a first portion of the tape frequency range and down converter 22 and bandpass filter 23 convert signals of the same FM frequencies received on antenna 13 to a second portion of the frequency range of VCR 25.

Figure 3:
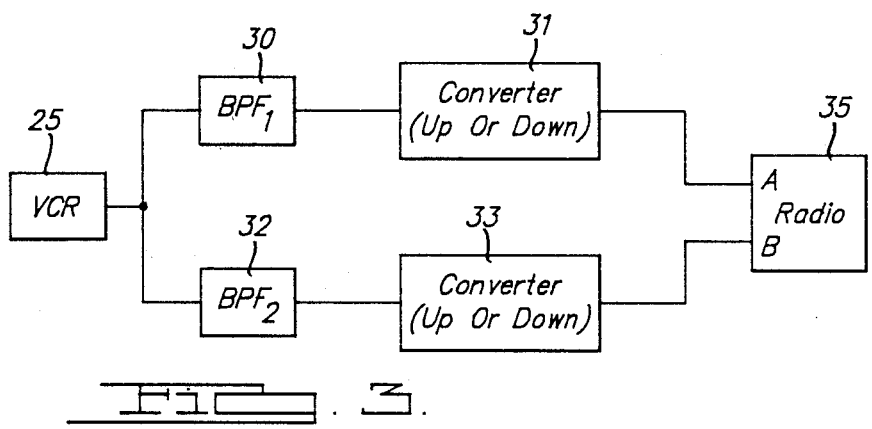
FIG. 3 is a block diagram showing reproduction circuits according to the present invention.

Recorded signals on a recording media can be reproduced and converted into appropriate test signals for a radio receiver using the apparatus shown in FIG. 3. A playback output of VCR 25 is coupled to bandpass filters 30 and 32 which have substantially identical frequency characteristics as bandpass filters 21 and 23, respectively. A down or up converter 31 couples bandpass filter 30 to an antenna input A of a radio receiver 35 and a down or up converter 33 couples bandpass filter 32 to an antenna input B of receiver 35. Converters 31 and 33 restore the recorded RF signals to the broadcast band originally received by antennas 12 and 13, whereby appropriate test signals are provided to the diversity inputs of receiver 35. Specific details of the frequency converters and bandpass filters are within the knowledge of those skilled in the art.

In order to record a substantial portion of a broadcast frequency band simultaneously, components 20–23 and 30–33 must be operable over a relatively wide bandwidth, such as 2 MHz in bandwidth for providing signals to be recorded in one-half of the pass band of VCR 25. Thus, a 2 MHz portion of the FM frequency band from 88.1 to 107.9 MHz can be recorded in diversity using a VCR 25 having a frequency range of 5 MHz while maintaining a 1 MHz wide deadband between channels for signal isolation.

Image rejection is achieved while operating on a wide bandwidth, by employing the converter structure shown in FIG. 4. It is well-known in the art that when a mixer is used to shift a signal in frequency, both a desired RF frequency and an image RF frequency signal appear in the output of the intermediate frequency (IF). These two RF frequency signals correspond to the sum and difference frequencies of the mixed signals. In a typical radio receiver, image frequencies can be rejected using a restricted bandwidth in a tuned RF amplifier stage. However, due to the desire to simultaneously record multiple broadcast stations in the present invention, relatively wide bandwidth components are used. Therefore, it is not feasible to reject image signals at the RF input. Instead, a converter 40 is preferably comprised of two or more mixing stages such that the image frequencies are located outside the FM band in a substantially unused portion of the very high frequency band, e.g., around 110–150 MHz.

Converter 40, shown in FIG. 4, can be either an up converter or a down converter depending on the particular broadcast frequency range being recorded or reproduced. An incoming signal, which may be either an RF signal from an antenna or a signal at the tape frequency from the VCR, is provided to a wideband mixer 41 which also receives a mixing signal at a first predetermined frequency $f_1$ provided by a first oscillator 42. A resulting IF signal is output from mixer 41 through an IF bandpass filter 43 to a second wideband mixer 44. Wideband mixer 44 receives a mixing signal $f_2$ from an oscillator 45. Wideband mixer 44 provides an output signal in either the tape frequency range during recording, or in the broadcast band of the originally recorded signal during playback. That output signal is provided either to a filter prior to recording, or to a radio during playback.

Figure 5:
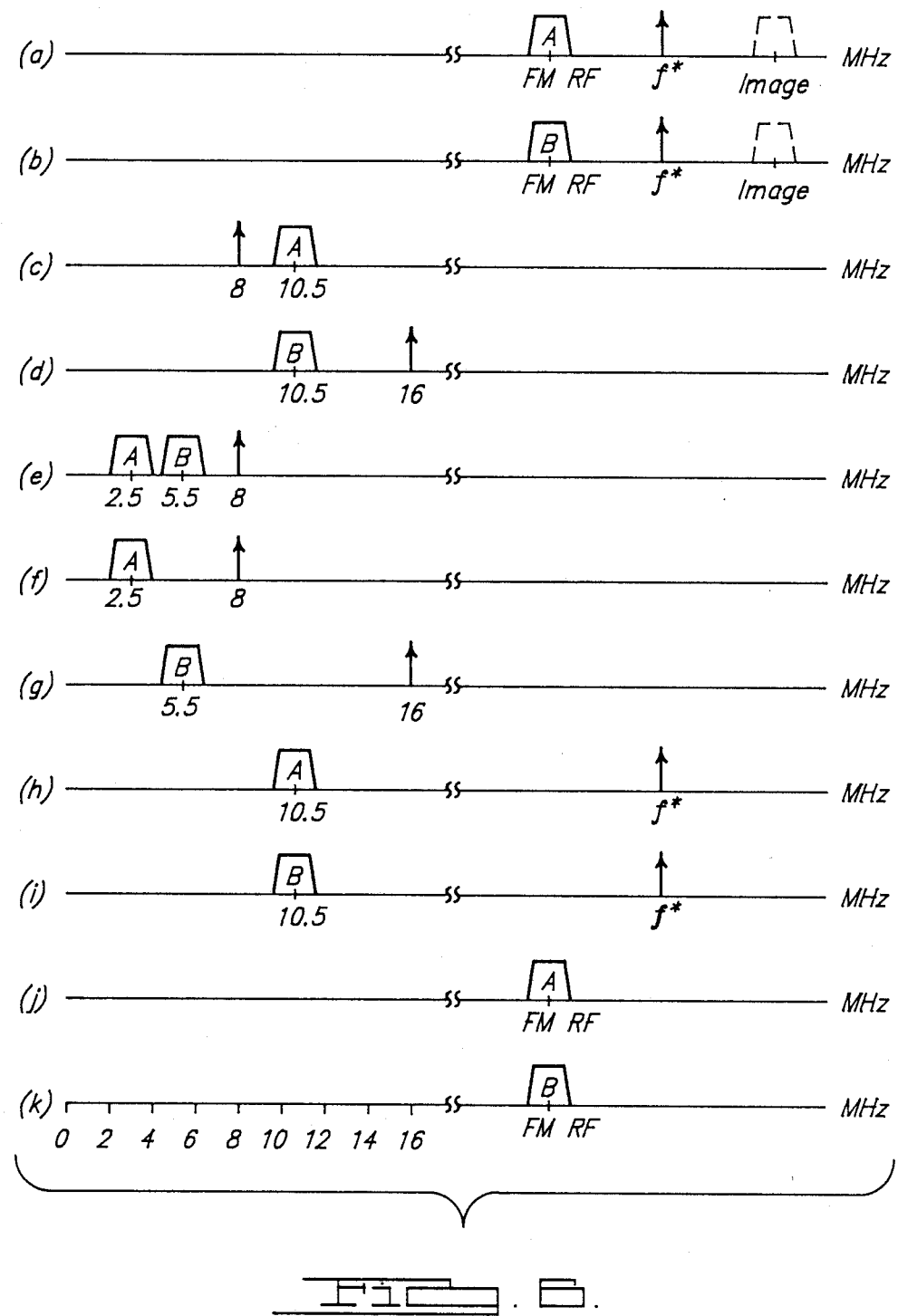
FIG. 5 is a block diagram showing a preferred embodiment of the invention useful for recording and reproducing FM broadcast signals in diversity.

FIG. 5 shows a detailed embodiment of the invention for recording FM broadcast signals in diversity. A pair of antennas 12 and 13 receive broadcast signals and are associated with a pair of channels respectively designated as A and B. Channel A includes the series connection of a down converter 50, a bandpass filter 51, and a down converter 52. Local oscillators 56 and 57 are connected to converters 50 and 52, respectively. Down converter 50 receives a mixing signal from a local oscillator 56. The frequency generated by local oscillator 56 is controlled by an operator input command designated f*. For example oscillator 56 may be a voltage-controlled oscillator and the operator may provide f* by means of a voltage signal from a potentiometer. Bandpass filter 51 receives IF signals from converter 50 and outputs a signal bandwidth of 2 MHz centered on about 10.5 MHz.

Local oscillator 57 provides a constant 8 MHz mixing signal to down converter 52. The 10.5 MHz centered IF signal from bandpass filter 51 is then frequency shifted by down converter 52 to about a 2.5 MHz centered signal.

Channel B includes the series connection of a down converter 60, a bandpass filter 61, and a down converter 62. Down converter 60 receives a mixing signal at frequency f* from oscillator 56. A local oscillator 63 provides a 16 MHz mixing signal to down converter 62. IF signals from the output of down converter 60 are limited to a bandwidth of about 2 MHz by bandpass filter 61 and are frequency shifted down to a center frequency of about 5.5 MHz by down converter 62.

The frequency-shifted signals from down converters 52 and 62 are provided to a summing amplifier 53. The summed output signal is a combination of the channel A and channel B signals. The combined signals are coupled to a low-pass filter 54 which has a cutoff frequency of 6.5 MHz to remove any image signals outside the tape frequency. The output of low-pass filter 54 is provided to the record input of a modified VCR 55. Thus, a 2 MHz wide portion of the FM band is recorded in diversity on modified VCR 55.

FIG. 6 shows the frequency shifting of signals during processing by the circuit of FIG. 5. The specific portion of the FM band recorded is determined by the commanded value of frequency f* generated by oscillator 56 and mixed with the A and B channels as shown in FIGS. 6a and 6b. Down converters 50 and 60 provide frequency-shifted broadcast signals with a range of intermediate frequencies centered on about 10.5 MHz containing the desired portion of the FM band without any significant contribution from image signals as shown in FIGS. 6c and 6d. Down converters 52 and 62 provide further frequency-shifting of the A and B channels to different portions of the frequency range of VCR 55, where they are respectively centered on about 2.5 MHz and 5.5 MHz, as shown in FIG. 6e, with an 8 MHz bias signal added (further explained in connection with FIG. 7). Down converter 52 receives an 8 MHz mixing signal from oscillator 57 to produce a 2 MHz wide band of frequencies centered on 2.5 MHz. Likewise, down converter 62 receives a 16 MHz mixing signal from oscillator 63 to generate signals centered on about 5.5 MHz.

Returning to FIG. 5, apparatus for reproducing channel A signals include the series connection of a low-pass filter 64, an up converter 66, a bandpass filter 67, and an up converter 68. An oscillator 71 provides 8 MHz mixing signals to up converter 66. An oscillator 70 provides mixing signals at a frequency f* to up converter 68. Channel B signals are reproduced by the series connection of low-pass filter 64, an up converter 76, a bandpass filter 77, and an up converter 78. Up converter 76 receives 16 MHz mixing signals from an oscillator 79. Low-pass filter 64 removes the 8 MHz bias signal used in recording and any noise present outside the range from 1.5 to 6.5 MHz used to record the FM broadcast signals. Up converter 78 receives mixing signals at frequency f* from oscillator 70.

Up converter 66 reproduces intermediate frequency signals in a range centered on about 10.5 MHz as shown by FIGS. 6f and 6h. Bandpass filter 67 has a pass band that is 2 MHz wide centered on 10.5 MHz, which thereby provides up converter 68 the desired IF signals. The IF signals are converted to the FM band according to the frequency received from oscillator 70, as shown by FIGS. 6h and 6j. The commanded frequency f* can have a value such that the FM signals in channel A can be placed anywhere within the FM band, including the portion from which the signals were originally recorded (i.e., when f* to the value used during recording). In channel B, up converter 76 provides an identical IF frequency band centered on 10.5 MHz by virtue of oscillator 79 providing a 16 MHz mixing signal (FIGS. 6g and 6i). The channel B IF signal is shifted to the FM band (FIGS. 6i and 6k) by up converter 78, which receives a mixing signal at frequency f* from oscillator 70. The FM outputs of channels A and B thus provide RF broadcast signals substantially identical to the RF signals originally received in diversity for recording.

Figure 7:
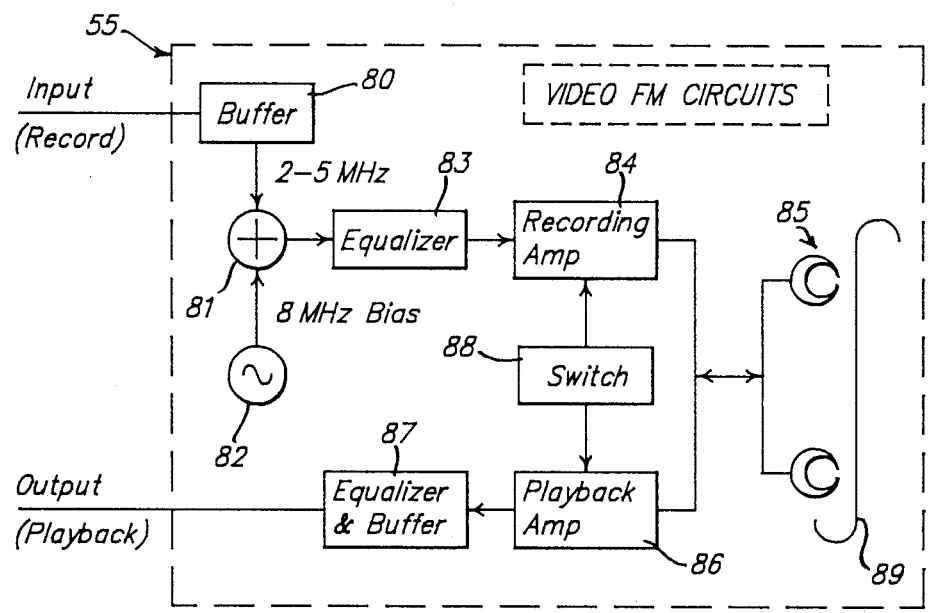
FIG. 7 is a block diagram showing a bypass circuit for modifying a commercial video cassette recorder for use in the present invention.

FIG. 7 shows the modification to VCR 55. A record input is coupled to a buffer 80 for providing electrical isolation before passing a band of frequencies from 1.5 to 6.5 MHz to a summing amplifier 81. A bias signal generator 82 provides an 8 MHz bias signal to summing amplifier 81. The addition of a bias signal to the signal being recorded is conventional and improves the ability of the VCR to record lower level signals.

The summed output of amplifier 81 is provided to an equalizer 83 and a recording amplifier 84 which are part of the original VCR. Signals from the recording amplifier 84 are provided to a tape recorder mechanism 85 including recording and reading heads, a tape drive, and a recording tape media 89. Signals from tape mechanism 85 are provided to a playback amplifier 86 and an equalizer and buffer 87, which are also original parts of the VCR. A switch 88 activates either recording amplifier 84 or playback amp 86 depending on whether the VCR is in the record or playback mode.

Direct connection to equalizers 83 and 87 of VCR 55 bypasses conventional circuitry (not shown) in VCR 55 which tunes and modulates video signals normally recorded by VCR 55. Since VCR modulation is by frequency, the FM broadcast signals recorded in this invention would be modulated by frequency a second time, which is undesirable. Therefore, that circuitry is bypassed.

Figure 8:
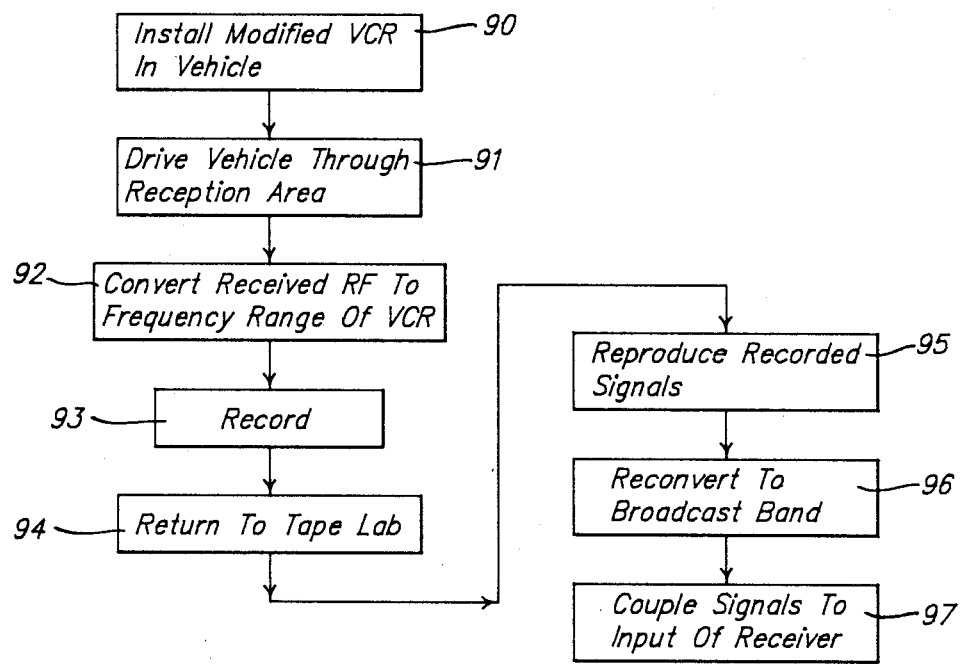
FIG. 8 is a flowchart of a method of the invention.

Turning now to FIG. 8, a method according to the present invention begins in step 90 where the modified VCR and circuitry of the present invention are installed in a vehicle. The vehicle is driven through a reception area containing broadcast signals in step 91. In step 92, the received RF broadcast signals are converted to the frequency range of the modified VCR. The converted signals are recorded in step 93.

In order to perform testing and evaluation of radio receiver equipment, the recorded media is returned to a fixed location such as a lab in step 94. The recorded signals are reproduced in step 95. The reproduced signals are reconverted to the original broadcast band in step 96. Finally, the reconverted signals are coupled to the input of a receiver or other equipment to be tested in step 97.

Thus, the present invention has provided a method and apparatus for receiving and recording RF broadcast signals in a modulated form such that recorded data can be played back in a fixed location to analyze data, to compare performance of radios under identical (i.e., recorded) test conditions, and to aid in development of radio and radio circuits. The necessity to conduct frequent field trips at remote locations is minimized, thus providing better efficiency in developing diversity radio systems and components.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method of providing test signals in a fixed location corresponding to radio-frequency broadcast signals received by a moving receiver comprising the steps of:
   moving a vehicle through an area receiving said broadcast signals;
   coupling antenna signals from an antenna mounted on said vehicle to a recording device, said antenna signals having a continuous frequency range including said broadcast signals and including frequencies between adjacent broadcasts;
   recording said antenna signals on a recording media in an undetected form;
   transporting said recording media to said fixed location; and
   reproducing the recorded signals in a form substantially equal to said antenna signals.

2. The method of claim 1 wherein said RF broadcast signals are derived from a plurality of antennas on said vehicle and wherein signals from each antenna are distinctly recorded on said recording media.

3. Radio testing apparatus for recording and reproducing radio-frequency signals in a broadcast band comprising:
   input means adapted to be coupled to a moving receiving antenna for receiving antenna signals in a first range of radio frequencies within said broadcast band;
   first frequency conversion means coupled to said input means for mixing said antenna signals with a first mixing signal to generate frequency-shifted signals in a second range of frequencies;
   recording means coupled to said first frequency conversion means for recording said frequency-shifted signals when in a record mode and for reproducing said frequency-shifted signals when in a playback mode; and
   second frequency conversion means coupled to said recording means for mixing reproduced frequency-shifted signals with a second mixing signal to generate antenna signals in any selected portion of said broadcast band for use in a stationary location for radio testing.

4. The apparatus of claim 3 wherein said second mixing signal frequency-shifts said reproduced signals such that said reproduced antenna signals are in a portion of said broadcast band other than the portion in which they were originally received by said antenna.

5. The apparatus of claim 3 wherein said recording means is comprised of a video cassette recorder including frequency modulating circuits coupled to a recording head through an equalizing amplifier, said apparatus further comprising:
   bypass means connecting said first frequency conversion means to said recording means by bypassing said frequency modulating circuits and providing a bias signal to said equalizing amplifier.

6. The apparatus of claim 5 wherein said bypass means comprises:
   a buffer amplifier receiving said frequency-shifted signals;
   a bias signal generator generating a bias signal having a frequency outside said second range of frequencies; and
   summing means for providing the sum of the output of said buffer amplifier and said bias signal to said equalizing amplifier.

7. Apparatus for recording and reproducing radio-frequency signals in a broadcast band comprising:
   input means adapted to be coupled to a pair of diversity antennas for receiving antenna signals in a first range of radio frequencies within said broadcast band;
   first frequency conversion means coupled to said input means to receive antenna signals from one of said antennas for mixing said antenna signals with a first mixing signal to generate first frequency-shifted signals in a second range of frequencies;
   second frequency conversion means coupled to said input means to receive antenna signals from he other of said antennas for mixing said antenna signals with a second mixing signal to generate second frequency-shifted signals in a third range of frequencies;
   tape means coupled to said first and second frequency conversion means for recording said frequency-shifted signals when in a record mode and for reproducing said frequency-shifted signals when in a playback mode;
   third frequency conversion means coupled to said tape means of mixing reproduced frequency-shifted signals in said second range of frequencies with a third mixing signal to recover said antenna signals corresponding to said one antenna; and
   fourth frequency conversion means coupled to said tape means for mixing reproduced frequency-shifted signals in said third range of frequencies with a fourth mixing signal to recover said antenna signals corresponding to said other antenna.

8. The apparatus of claim 7 further comprising:
first filter means coupled between said first frequency conversion means and said tape means for attenuating frequencies outside said second range of frequencies;
second filter means coupled between said second frequency conversion means and said tape means for attenuating frequencies outside said third range of frequencies;
third filter means coupled between said tape means and said third frequency conversion means for attenuating frequencies outside said second range of frequencies; and
fourth filter means coupled between said tape means and said fourth frequency conversion means for attenuating frequencies outside said third range of frequencies.

9. The apparatus of claim 8 further comprising a summing amplifier coupling said first filter means and said second filter means to said tape means.

10. The apparatus of claim 9 wherein said tape means is comprised of a video cassette recorder including frequency modulating circuits coupled to a recording head through an equalizing amplifier, said apparatus further comprising:
bypass means connecting said summing amplifier to said tape means for bypassing said frequency modulating circuits and providing a bias signal to said equalizing amplifier.

11. The apparatus of claim 10 wherein said bypass means comprises:
a buffer amplifier receiving said frequency-shifted signals;
a bias signal generator generating a bias signal having a frequency outside said second and said third range of frequencies; and
summing means for providing the sum of the output of said buffer amplifier and said bias signal to said equalizing amplifier.

12. A method for testing the mobile performance of a radio receiver comprising the steps of:
receiving antenna signals from a mobile antenna including a first frequency;
converting said antenna signals to a frequency-shifted signal including a second frequency;
recording said frequency-shifted signal using a recording device transported in association with said mobile antenna;
reproducing said frequency-shifted signal at a fixed location;
converting said frequency-shifted signal back to said antenna signals including said first frequency; and
applying said antenna signals to said radio receiver to be tested.

13. The method of claim 12 wherein said antenna signals include signals transmitted by a plurality of broadcast stations and signals at frequencies between said broadcast stations.

14. The method of claim 12 wherein said radio receiver is a diversity reception system, said method further comprising the steps of:
simultaneously receiving said antenna signals with a second diversity antenna;
converting said antenna signals from said second diversity antenna to a second frequency-shifted signal including a third frequency;
recording said second frequency-shifted signal using said recording device;
reproducing said second frequency-shifted signal;
converting said second frequency-shifted signal back to said antenna signals including said first frequency; and
applying said antenna signals corresponding to said second antenna to a diversity input of said radio receiver.

* * * * *